March 18, 1924. Re. 15,799

J. A. WHERRY

COLLATING DEVICE FOR TYPEWRITERS AND ADDING MACHINES

Original Filed May 5, 1919 3 Sheets-Sheet 1

Inventor
John A Wherry
by B C Stickney
Attorney

March 18, 1924. Re. 15,799

J. A. WHERRY

COLLATING DEVICE FOR TYPEWRITERS AND ADDING MACHINES

Original Filed May 5, 1919 3 Sheets-Sheet 2

Inventor
John A Wherry
by B. C. Stickney
Attorney

March 18, 1924. Re. 15,799

J. A. WHERRY

COLLATING DEVICE FOR TYPEWRITERS AND ADDING MACHINES

Original Filed May 5, 1919 3 Sheets-Sheet 3

Inventor
John A Wherry
by O B Stickney
Attorney

Reissued Mar. 18, 1924. Re. 15,799

UNITED STATES PATENT OFFICE.

JOHN A. WHERRY, OF NEW ORLEANS, LOUISIANA, ASSIGNOR TO UNDERWOOD TYPEWRITER COMPANY, OF NEW YORK, N. Y., A CORPORATION OF DELAWARE.

COLLATING DEVICE FOR TYPEWRITERS AND ADDING MACHINES.

Original No. 1,324,632, dated December 9, 1919, Serial No. 294,775, filed May 5, 1919. Application for reissue filed June 4, 1921. Serial No. 475,122.

*To all whom it may concern:*

Be it known that I, JOHN A. WHERRY, a citizen of the United States, residing at New Orleans, in the parish of Orleans, in the State of Louisiana, have invented certain new and useful Improvements in Collating Devices for Typewriters and Adding Machines; and I do hereby declare the following to be a full, clear, and exact description of the invention, such as will enable others skilled in the art to which it appertains to make and use the same.

This invention relates to a collating device for typewriters and adding machines, and particularly to typewriting machines without the adding features, wherein a revoluble platen is used for ledger posting and statement work.

The invention is in the nature of an improvement on the invention disclosed in my Patent No. 1,336,453, dated April 13, 1920 (now Reissue Patent No. 15,747, dated January 15, 1924).

The primary object of the invention resides in the provision of a collating device on which the working sheets may be assembled or collated and carried to the printing position on the typewriter or adding machine without disarrangement.

More particularly, in mechanism of the character mentioned, an object of the invention is the provision of means for effecting relative and independent movement to sheet-holding position of a plurality of clamps, between which, in the collating operation, the edges of the sheets are positioned and secured; and for independently holding such clamps in their released and effective positions.

Another object of the invention is the provision of means for the simultaneous release, and automatic locking in released position, of a plurality of clamps which are independently actuable from such released position to clamping position, and between which clamps, the sheets, or certain of the same, may be interposed and held; that is to say, interposed in the sense that the edge of one sheet, when beneath the clamp which actually holds the same, overlies another of the clamps. It is an object of the invention to provide the foregoing clamp-actuating and holding means in connection with clamps which, in the releasing operation, are not swung or lifted out of the collated body of sheets, and which, therefore, in such releasing operation, do not bend up or tend to cut or tear any of the sheet edges with which the clamps are interleaved.

Other features and advantages will hereinafter appear.

In the accompanying drawings.

Figure 1:
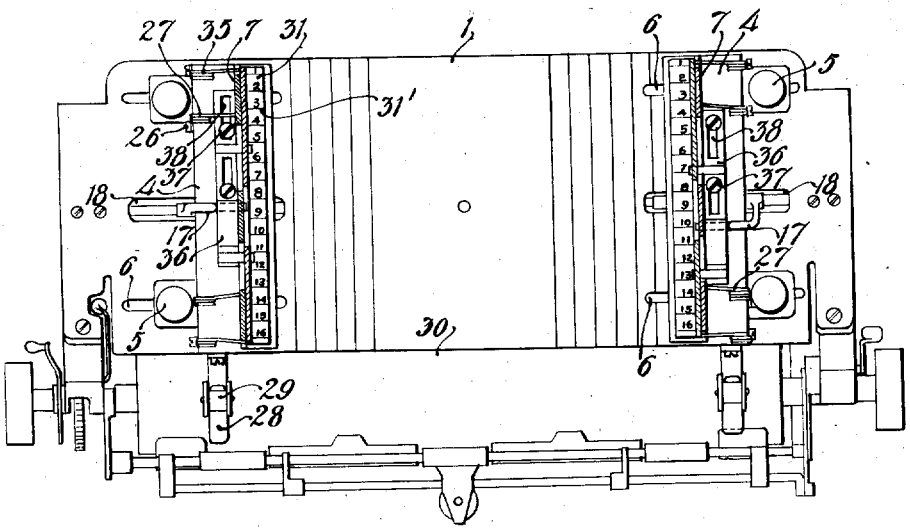
Figure 1 is a front elevation of my device with the vertical webs of the sheet clamps shown in section so as to more clearly distinguish the same.
Figure 2:
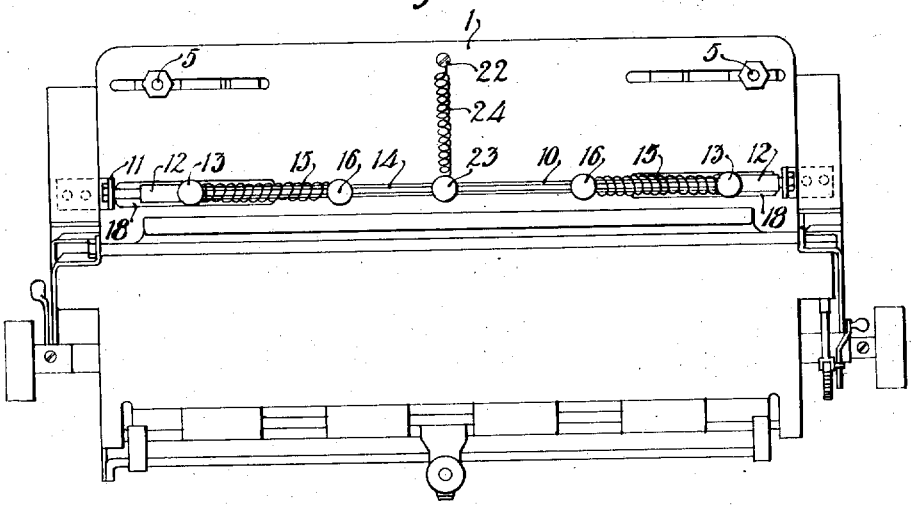
Figure 2 is a rear elevation.
Figure 3:
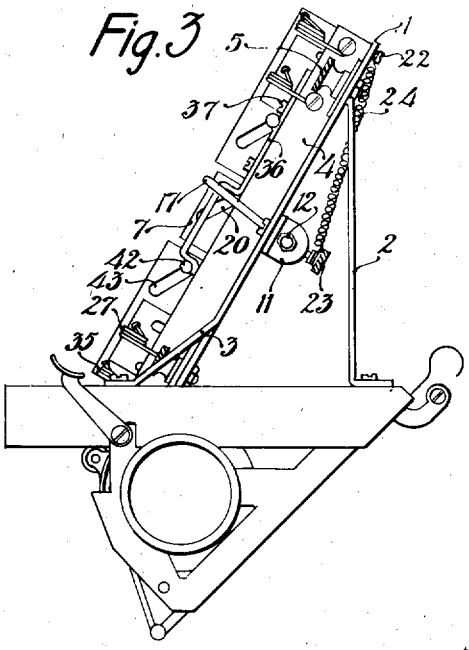
Figure 3 is an end elevation showing both of the sheet clamps raised.
Figure 4:
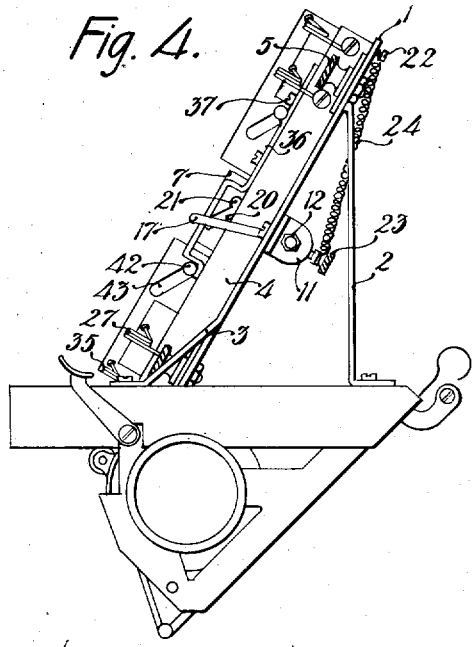
Figure 4 is a similar elevation showing the under sheet clamp lowered.
Figure 5:
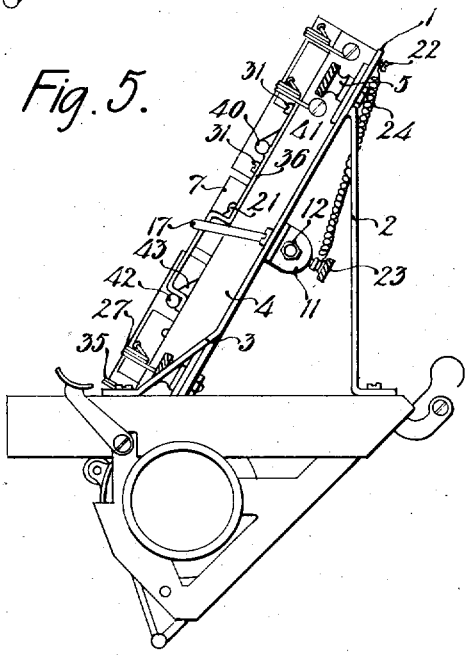
Figure 5 is an elevation showing both of the clamps lowered.
Figure 6:
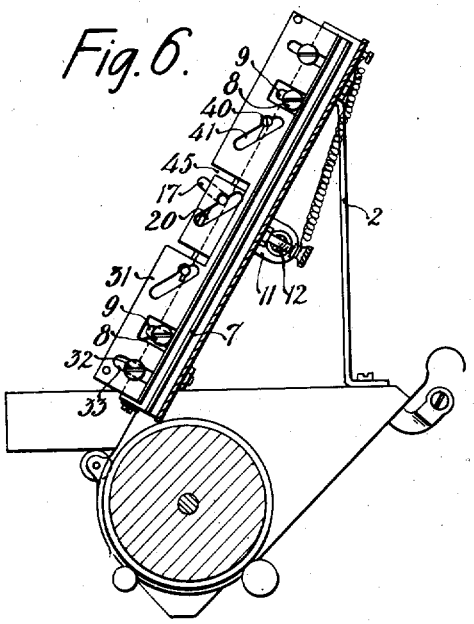
Figure 6 is a sectional view showing both of the clamps raised.
Figure 7:
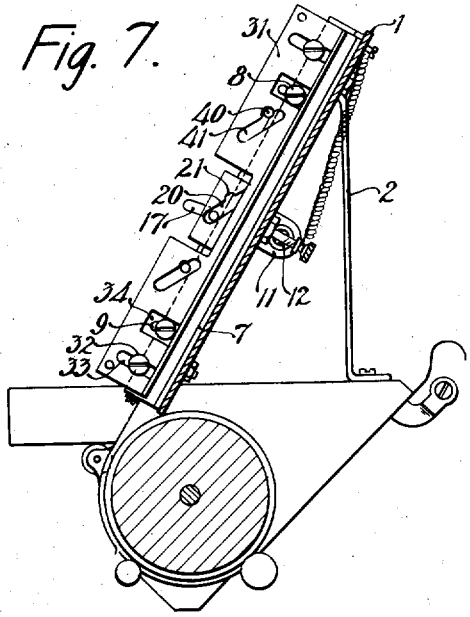
Figure 7 is a sectional view showing the under clamp lowered.
Figure 8:
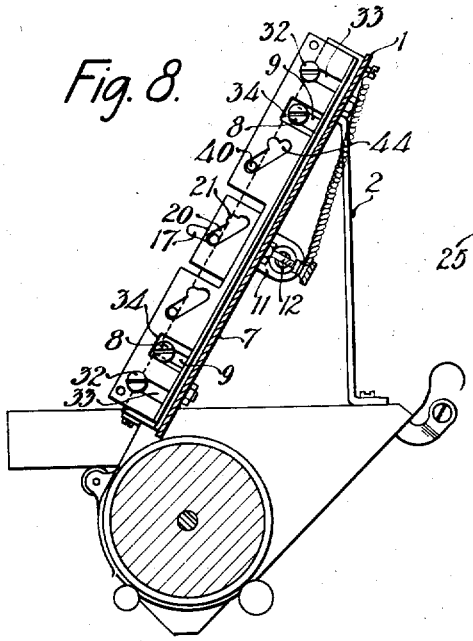
Figure 8 is a sectional view showing both of the clamps lowered.
Figure 9:
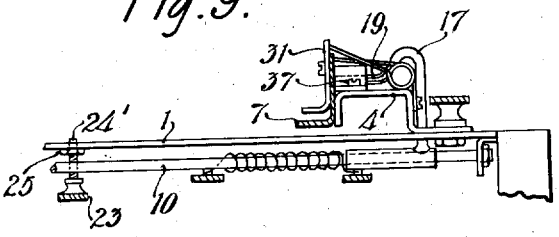
Figure 9 is a view looking at one of the brackets with the clamps shown in section to more clearly distinguish the same.

As in the invention disclosed in the above-referred to patent, the device includes a board 1, which is supported on the inner carriage of the typewriting or adding machine by standards 2 and 3, which are bent from the material of the board itself. A pair of brackets 4 are secured on the front faces of the collating board 1, adjustably by thumb screws 5, which screws extend through slots 6 in the board whereby the brackets may be moved to or away from each other. On each of these brackets 4 an angular sheet clamp 7 is mounted for movement to and away from the board 1, the sheet clamps being held in position on the brackets by screws 8, which extend through slots 9 in the vertical webs of the sheet clamps. A rotary rod 10 is mounted on the rear of the board in brackets 11 and sleeves 12 are mounted on the ends of this rod 10. These sleeves are adapted to rotate and to slide longitudinally of the rod, but are capable of being held against relative rotative movement by thumb screws 13, which are mounted in the sleeves and project into a slot 14 in the rod. Thus, as in the above-referred to patent, the sleeves may have either relative rotative movement on the rod, or may be prevented from having such movement, but permitted to have relative longitudinal movement by adjustment of the thumb screws 13. The springs 15 encircle the rod 10 and are secured to the thumb screws 13 and at their other ends to thumb screws 16 carried by the rod and normally tend to move the sleeves toward each other and to rotate the same on the rod. Arms 17 project from the sleeves 12 through slots 18 in the collating board and are in the form of bell cranks, each having a straight portion 19, which engages in a diagonally disposed slot 20 in the vertical web of the under sheet clamp 7, which slots have notches 21 therein for the engagement of the straight portions 19 of the arms 17, whereby the clamping members 7 will be maintained in raised relation to the collating board 1 in the manner described in the above-referred to patent. Secured to the rear of the collating board at 22 and to a thumb screw 23 on the rod 10, is a spring 24, which normally tends to rotate the rod 10 so as to throw the clamping members 7 against the front faces of the board. This thumb screw 23 is provided with a projecting bill 24′ which is adapted to extend into an opening in the board 1 to prevent the rotation of the rod 10 under the influence of the spring 24. A lock nut 25 is mounted on this thumb screw 23 and is so located that it will prevent the bill of the thumb screw from projecting beyond the working face of the board 1 and will also prevent the entire withdrawal of the thumb screw from the rod.

Secured to the brackets 4 by screws 26, are springs 27, which tend to cause the uniform movement of the ends of the sheet clamping members 7 toward the face of the board. Projecting downwardly from the brackets 4 are feed arms 28, having feed rollers 29 thereon, which operate against the platen 30.

A second or upper sheet clamping member 31 is associated with each of the sheet clamping members 7. This upper sheet clamping member is of angular form and is slidably mounted on the sheet clamping members 7, being guided in its movement by screws 32 which project through slots 33 in the vertical web of the same. This vertical web is also provided with slots 34 for the accommodation of the heads of the screws 8 on which the sheet clamping member 7 operates. Springs 35, which are secured to the brackets 4 and project through openings in the vertical webs of the sheet clamping members 31, normally tend to move these members toward the board.

Slides 36 are mounted on the brackets 4 by means of set screws 37, which project through slots 38 in the slides, thus permitting the slides to have movement longitudinally of the brackets. Each of these slides is provided with an upwardly extending or bowed portion, beneath which the straight portion 19 of the adjacent arm 17 extends. From one end of each of the slides a pin 40 extends, which pin projects through a diagonally disposed slot 41 in the vertical web of the upper sheet clamping member 31, and at the other end of each of the clamps a second finger 42 is provided, which extends through a similar diagonally arranged slot 43 in the clamping member 31. Each of these slots is provided with a notch 44 for the reception of the fingers, whereby when the fingers are engaged in the notches, and are held therein against accidental displacement by the pressure of the springs 35, the clamping member will be maintained in its raised position, that is to say, in spaced relation to the board and to the lower clamping member. It will be noted that the vertical web of each of the upper clamping members 31 is cut away at 45, to accommodate the end of the adjacent arm 17.

When the rock arm 17 is pressed upwardly it engages with the loop of the slide 36 and pushes said slide upwardly. The upward movement of the arm 17 with this slide raises the sheet alining and clamping members 7 away from the board and the sheet alining and clamping members 31 away from the first-mentioned members 7. When the rock arms are raised in the above manner they engage in the notches 21, thus maintaining the upper and lower sheet alining and clamping members 7 in their raised positions. The pins 40 engage in the notches 44 and maintain the upper sheet alining and clamping members 31 in their raised positions.

A sheet of paper is inserted in the machine in the usual manner and turned up by the platen knob under the feed rollers 29. The work sheet passes under the brackets 4 and the clamps 7 and 31. This work sheet is then alined at right angles with the printing position on the platen by abutting said sheet against the under side of the vertical webs of the brackets 4. The feed rollers of the typewriter are then released and the work sheet is held in position on the platen and on the collating board by the feed rollers 29 of the collating board 1.

The second work-sheet with the carbon paper is inserted around the platen by hand, but this second sheet does not pass under the feed rollers 29 of the collating board. This second sheet is placed beneath the sheet alining and clamping members 7, and if ruled lines are on the work-sheet it is alined at right angles with the printing position of the platen by forcing the ruled lines of the work-sheet in line with one of the side edges of said members 7 and the proper printing position is placed under the graduated lines 31′ on the members 31. If the work-sheet is not ruled, the desired printing position is alined by one of the graduations on the members 31, and the side edge of such sheet is alined with respect to the edges of the lower sheet alining and clamping member 7. The rock arm is then lowered, which, assisted by springs 24, causes the movement of the lower member 7 toward the board and firmly holds the work-sheet with the carbon paper firmly in place upon the first sheet inserted. The third work-sheet with the carbon paper is inserted in the same manner as the second, but this sheet is placed on top of the members 7 and brought in proper position with the second work-sheet and the side edges are abutted against the vertical portions of the members 7, whereby it is lowered at right angles with the printing position of the typewriter. The upper sheet alining and clamping members 31 are then lowered by pressing down on the slide 36 to release the same to the action of springs 35. Thus the third sheet and carbon are clamped in place. The feed rollers of the typewriter are then raised against the work-sheets, and hold them in proper position on the platen. The rock arm 17 is then raised, which in turn raises the slide 36, whereby the sheet alining and clamping members 7 and 31 are raised against the action of the springs 24 and 35, thus freeing the work-sheets. The work-sheets may then be turned down to the proper printing position on the typewriter by the platen knob, and the operator may then proceed with the writing or printing. The work-sheets may be fed either upwardly or downwardly under the brackets 6 and the members 7 and 31.

After the writing or printing has been completed the feed rollers of the typewriter are lowered from the work-sheets and the second and third sheets are moved from the typewriter and collating board. The first sheet inserted, however, remains in its proper position on the typewriter and on the collating board, being held in this position by the feed rollers 29. This first sheet is generally used as a proof sheet. In other words all records that are printed or written on the second and third sheets are recorded on the proof sheets.

Variations may be resorted to within the scope of the invention, and portions of the improvements may be used without others.

Having thus described my invention, I claim:

1. A collating device including a board, superimposed sheet clamping and alining members arranged on the upper side of the board, and means for raising said members from the board.

2. A collating device including a board, superimposed sheet clamping and alining members arranged on the upper side of the board, means for raising said members from the board, and means for raising the upper members from the lower members.

3. A collating device including a board, brackets mounted on the board, upper and lower sheet clamping and alining members supported by said brackets, means normally tending to move the lower members toward the board, means tending to move the upper members toward the lower members, and means for raising the lower members from the board.

4. A collating device including a board, brackets mounted on the board, means for adjusting the brackets toward and away from each other, upper and lower sheet clamping and alining members supported by said brackets, means normally tending to move the lower members toward the board, means tending to move the upper members toward the lower members, and means for raising the lower members from the board.

5. A collating device including a board, brackets mounted on the board, upper and lower sheet clamping and alining members supported by said brackets, resilient means normally tending to move the lower members toward the board, means tending to move the upper members toward the lower members, and means for raising the lower members from the board.

6. A collating device including a board, brackets mounted on the board, upper and lower sheet clamping and alining members supported by said brackets, each member including a sheet-clamping portion and a sheet-gaging portion, means normally tending to move the lower members toward the board, means tending to move the upper members toward the lower members, means for raising the upper members from the lower members, and means for raising the lower members from the board.

7. A collating device including a board, brackets mounted on the board, upper and lower sheet clamping and alining members supported by said brackets, each member including a sheet-clamping portion and a sheet-gaging portion, means normally tending to move the lower members toward the board, means tending to move the upper members toward the lower members, means for raising the lower members from the board, and means for maintaining the lower members in their raised positions.

8. A collating device including a board, brackets mounted on the board, upper and lower sheet clamping and alining members supported by said brackets, each member including a sheet-clamping portion and a sheet-gaging portion, means normally tending to move the lower members toward the board, means tending to move the upper members toward the lower members, means for raising the lower members from the board, and independent means for maintaining the upper members raised from the lower members.

9. A collating device including a board, upper and lower sheet clamping and alining members, each including a sheet-clamping portion and a sheet-gaging portion, and means for raising the lower members from the board, and for simultaneously raising the upper members from the lower members.

10. A collating device including a board, upper and lower sheet clamping and alining members, each including a sheet-clamping portion and a sheet-gaging portion, and means for raising the lower members from the board and for simultaneously raising the upper members from the lower members, said means being operative to permit the independent lowering of the upper and lower members.

11. A collating device including a board, upper and lower sheet clamping and alining members, each including a sheet-clamping portion and a sheet-gaging portion, means for raising the lower members from the board and for simultaneously raising the upper members from the lower members, said means being operative to permit the independent lowering of the upper and lower members, and means for lowering the upper sheet clamping and alining members.

12. A collating device including a board, upper and lower sheet clamping and alining members, means for raising the lower members from the board and for simultaneously raising the upper members from the lower members, said means being operative to permit the independent lowering of the upper and lower members, and resilient means for lowering the upper sheet clamping and alining members.

13. A collating device including a board, upper and lower sheet clamping and alining members, means for raising the lower members from the board and for simultaneously raising the upper members from the lower members, and means for independently maintaining the upper and lower members in their raised positions, said means being operative to permit the independent lowering of the upper and lower members.

14. In a typewriting machine, in combination, a platen; a collating board; means for clamping a sheet to the board; means for clamping to the board a sheet superposed upon the first-mentioned sheet and clamp; said clamps projecting into the sheet-field of the board from the same side thereof; means for supporting the clamps independently of each other; means for moving the clamps successively, the clamp for the lower sheet forward and independent of the other, to their effective positions, in which the clamp first set is interposed, as aforesaid, between the edge of the sheet held thereby and the edge of the sheet held by the clamp next set; mechanism in connection with the clamps for releasing the same, and means for determining a released position of the first-mentioned clamp in which it remains projected into the sheet-field substantially parallel to the board.

15. In a typewriting machine, in combination, a platen; a collating board; means for clamping a sheet to the board; means for clamping to the board a sheet superposed upon the first-mentioned sheet and clamp; said clamps projecting into the sheet-field of the board from the same side thereof; a sheet side-edge-gaging device for supporting the clamps independently of each other and with provision for right line movement toward and from the collating board; means for moving the clamps successively, the clamp for the lower sheet forward and independent of the other, to their effective positions, in which the clamp first set is interposed, as aforesaid, between the edge of the sheet held thereby and the edge of the sheet held by the clamp next set; mechanism in connection with the clamps for releasing the same, and means for determining a released position of the first-mentioned clamp in which it remains projected into the sheet-field substantially parallel to the board.

16. In a typewriting machine, in combination, a platen; a collating board; means for clamping a sheet to the board; means for clamping to the board a sheet superposed upon the first-mentioned sheet and clamp; means for moving the clamps successively and independently of each other to their effective positions, in which the clamp first set is interposed, as aforesaid, between the edge of the sheet held thereby and the edge of the sheet held by the clamp next set; and means for effecting a differential movement of the clamps from the board, simultaneously to release the same.

17. In a typewriting machine, in combination, a platen; a collating board; means for clamping a sheet to the board; means for clamping to the board a sheet superposed upon the first-mentioned sheet and clamp; means for moving the clamps successively and independently of each other to their effective positions, in which the clamp first set is interposed, as aforesaid, between the edge of the sheet held thereby and the edge of the sheet held by the clamp next set; means for effecting a differential movement of the clamps from the board, simultaneously to release the same, and means whereby the clamps may be independently released.

18. In a typewriting machine, in combination, a platen; a collating board; means for clamping a sheet to the board; means for clamping to the board a sheet superposed upon the first-mentioned sheet and clamp; said clamps projecting into the sheet-field of the board from the same side thereof; resilient means for moving the clamps successively and independently of each other from their normal, released, positions to their effective positions, in which the clamp first set is interposed, as aforesaid, between the edge of the sheet held thereby and the edge of the sheet held by the clamp next set; means for manually controlling the action of the resilient clamp-actuating means; and means for releasing the clamps, without withdrawal of the same from between the sheets.

19. In a typewriting machine, in combination, a platen; a collating board; a pair of sheet-clamps, one acting against the board to hold a sheet thereto, and the other acting against the first, to cause a second sheet, superposed on the first sheet, to be gripped between the two clamps; means for moving the clamps, successively and independently to sheet-clamping position; and mechanism in connection with the clamps for simultaneously separating the clamps, one from the other, and from the board, to release the sheets.

20. In a typewriting machine, in combination, a platen; a collating board; a pair of sheet-clamps, one acting against the board to hold a sheet thereto, and the other acting against the first, to cause a second sheet, superposed on the first sheet, to be gripped between the two clamps; means for moving the clamps to sheet-clamping position; means for separating the clamps, one from the other, and from the board, to release the sheets; and means for holding the clamps in their respective released positions.

21. In a typewriting machine, in combination, a platen; a collating board; a pair of thin, flat sheet-clamps, one acting against the board to hold a sheet thereto, and the other acting against the first, to cause a second sheet, superposed on the first sheet, to be gripped between the two clamps; means for moving the clamps, successively and independently to sheet-clamping position; and mechanism in connection with the clamps for separating the clamps, one from the other, and from the board, to release the sheets.

22. In a typewriting machine, in combination, a platen; a collating board; a pair of sheet-clamps, one acting against the board to hold a sheet thereto, and the other acting against the first, to cause a second sheet, superposed on the first sheet, to be gripped between the two clamps; means for moving the clamps, successively and independently to sheet-clamping position; and means for simultaneously effecting a slight, translatory lift of the clamps, one from the other, and from the board, to release the sheets; the clamps remaining in the sheet-field, with the first clamp interposed between the two sheets, in the released position.

23. A collating device including a table and superimposed sheet-clamping members arranged on the sheet-guiding side of the table and movable therefrom, each of said members being provided with a side-edge gage for a sheet to be set over such member.

24. A collating device including a table and superimposed sheet-clamping members arranged on the sheet-guiding side of the table, one of said members being provided with a side-edge gage to gage a work-sheet inserted between that member and another of said members adjacent thereto.

25. A collating device including a table, a side-edge gage for a work-sheet on said table, a member to clamp said work-sheet against said table and having at its upper side a sheet-engaging surface and a side-edge gage to co-operate with a second work-sheet resting on said surface, and a second member to clamp the second work-sheet against said sheet-engaging surface of the first-mentioned clamping member.

JOHN A. WHERRY.

Witnesses:

St. Clair Adams,

J. N. Swing.